(12) United States Patent
Noll et al.

(10) Patent No.: US 6,511,194 B1
(45) Date of Patent: Jan. 28, 2003

(54) POINTER INSTRUMENT

(75) Inventors: Heinrich Noll, Gross-Umstadt (DE); Frank Jansa, Frankfurt (DE)

(73) Assignee: Mannesmann VDO AG, Frankfurt (DE)

( * ) Notice: Subject to any disclaimer, the term of this patent is extended or adjusted under 35 U.S.C. 154(b) by 0 days.

(21) Appl. No.: 09/461,548

(22) Filed: Dec. 14, 1999

(30) Foreign Application Priority Data

Dec. 15, 1998 (DE) .......................................... 198 57 860

(51) Int. Cl.$^7$ ............................................... G01D 11/28
(52) U.S. Cl. ............................. 362/23; 362/29; 362/84; 362/489; 116/288; 116/286
(58) Field of Search ............................. 362/23, 29, 84, 362/489; 116/228, 286, 287, 48, 288, 36, DIG. 35, DIG. 36

(56) References Cited

U.S. PATENT DOCUMENTS

| 2,603,129 | A | * | 7/1952 | Dreyer ........................ 362/29 |
| 4,727,525 | A | * | 2/1988 | Gogniat et al. .............. 368/294 |
| 5,697,322 | A | | 12/1997 | Hay et al. ................... 116/286 |
| 5,739,545 | A | | 4/1998 | Guha et al. ................... 257/40 |

FOREIGN PATENT DOCUMENTS

| DE | 4310082 | 9/1994 |
| DE | 4410253 | 10/1994 |
| DE | 19537346 | 4/1996 |
| DE | 19509450 | 9/1996 |
| DE | 29621618 | 2/1997 |
| DE | 29713208 | 9/1997 |
| FR | 2726363 | 5/1996 |
| WO | 9013148 | 11/1990 |
| WO | 9609522 | 3/1996 |

OTHER PUBLICATIONS

Gu, G. at al.: Transparent Organic Light Emitting Devices. In: Appl. Phys. Lett. 68(19), May 6, 1996, p. 2606–2608.
JP Patent Abstracts of Japan: 08114467 A, May 7, 1996.
JP Patent Abstracts of Japan: 08094396, Apr. 12, 1996.

* cited by examiner

Primary Examiner—Sandra O'Shea
Assistant Examiner—Guixoung Lee
(74) Attorney, Agent, or Firm—Martin A. Farber

(57) ABSTRACT

In a pointer instrument (1) having a pointer shaft (12) that deflects a pointer flag (10), the pointer flag (10) can be illuminated by means of a light source (14). For this purpose, the light source (14) is formed, for example, as a light-emitting polymer (13), which is applied between the pointer flag (10), which is formed at the same time as an electrode, and a further, transparent electrode (15), and emits light of any desired coloration under appropriate electrical excitation. The pointer flag (10) can assume any desired shape as the result of using such a light source (14) that can be shaped. In particular, multiple curvatures can be represented without differences in brightness occurring in this case.

29 Claims, 2 Drawing Sheets

POINTER INSTRUMENT

FIELD AND BACKGROUND OF THE INVENTION

The invention relates to a pointer instrument, especially for a motor vehicle, having a pointer with a pointer shaft that deflects a pointer flag and having a light source that is connected so as to rotate with the pointer, it being possible for the pointer flag to be illuminated by means of the light source.

Such a pointer instrument is nowadays widely used in motor-vehicle construction practice and is thus known. In this case, the pointer shaft is designed, for example, as a light conductor and therefore permits the indirect illumination of the pointer flag by means of a rear light source. Other embodiments are known, in which the light source is arranged at the upper end of the pointer shaft so as to be invisible to the viewer and radiates directly into the pointer flag.

The disadvantage with the two above-described embodiments of a pointer instrument is that uniform illumination of the pointer flag requires specific shaping of the cross-sectional area. In particular, the underside of the pointer flag, facing away from the viewer, is inclined with respect to the pivoting plane of the pointer flag, so that the incident light is reflected there and emerges uniformly on the upper side of the pointer flag, which faces the viewer and is essentially flat.

By contrast, freely shaped pointer flags can in principle be illuminated only when both the uniform emergence of part of the light and the conduction of a further part of the light as far as an end section of the pointer flag is ensured by multiple reflection in the interior of the pointer flag. In this case, it is virtually impossible in practice to avoid differently bright portions of the pointer flag. Similar problems also occur if, instead of an essentially flat surface of the pointer flag, profiled or contoured shapes are to be used, since this hampers the emergence of the light.

In addition, on account of the comparatively low-level illumination of a curved pointer flag, it is not possible to provide for its arrangement on the rear of a diffusely transparent covering disk which covers the display, as would be increasingly desirable because of specific requirements with regards to the design.

Close limits are therefore placed on stylistic freedom if poorer legibility and, under certain circumstances, a lower-quality appearance are not simultaneously tolerated.

SUMMARY OF THE INVENTION

The invention is based on the problem of configuring a pointer instrument of the type mentioned at the beginning in such a way that almost any desired shaping of the pointer flag is made possible without impairing the legibility as a result of differences in brightness in different subareas of the pointer flag.

According to the invention, this problem is achieved in that the contour of the light source can be shaped or is shaped essentially to correspond to at least one portion of the outside of the pointer flag.

This formation of the light source achieves a uniform emission of light which is independent of the pointer shape and, as a result, increases the legibility. The pointer flag may have any desired shape having a configuration which, in particular, is also multiply curved. For this purpose, the light source is either pre-shaped to correspond to the pointer flag or, if a flexible or resilient light source is used, can be matched to the pointer flag.

The light source could be of three-dimensional form in this case. According to an advantageous development of the invention, however, the pointer is particularly light and compact if the light source is a flat radiator having a low height. In this case, the height is of the order of magnitude of one millimeter.

To this end, an embodiment of the invention in which the light source has an electroluminescent film is particularly advantageous. As a result of the low thickness and the flexible properties of such an electroluminescent film, pointer flags of any desired shape can be illuminated without difficulty, the uniform emission of light from the light source designed in this way ensuring high operational reliability. In particular, even large-area pointer flags can be illuminated in this way, without a significant change to the pointer instrument having to be undertaken. The electroluminescent film can be arranged both on the upper side of the pointer flag, inclined toward a viewer, and on the rear of a pointer flag that is designed to be transparent for this purpose.

The light source is particularly simple to produce and has a high luminance if it advantageously has an organic LED.

The light source could have a low-polymeric organic compound. A particularly beneficial development of the invention is provided, however, if the light source has an electrically excitable, light-emitting polymer.

By this means, illumination over the whole area, especially even the edge regions of the pointer flag, can be achieved. In this case, in addition to any desired coloration, segments with different colorations can also be displayed. For this purpose, the light-emitting polymer can be excited between two electrodes, at least that electrode which is inclined toward a viewer being largely transparent. In this case, the light-emitting polymer is also suitable for illuminating the edge regions of the pointer flag, it being possible at the same time for the weight of the pointer flag to be reduced significantly.

The light source can be formed as a very flat surface light emitter. As a result, a flat pointer flag with a low weight and invisible side edges can also be implemented.

A light source having a light-emitting polymer has the particular advantages of the ability to be dimmed simply and of being operated in an uncomplicated way with a DC voltage of less than 12 V, preferably below 10 V. In addition, light-emitting polymers make it possible to achieve luminances in which the light-emitting color of the light sources can easily be detected during the day, that is to say with a high ambient brightness. Because of the high luminance, such a pointer is also suitable for black-panel combined instruments in motor vehicles.

It is also particularly beneficial in this case if the pointer flag is formed as an electrode that excites the light-emitting polymer.

A polymer with the desired property can readily be applied, in accordance with the shaping carried out, to the pointer flag, which is designed to be metallic for this purpose. To this end, the second electrode is formed to be essentially transparent and is arranged approximately parallel to the pointer flag on the upper side of the polymer layer. As a result of the omission of a second, separate electrode, the pointer weight can be reduced further.

A particularly effective configuration of the invention is provided if the pointer flag has a number of portions that can be illuminated independently.

By this means, the different portions of the pointer flag can be emphasized optically and, as a result, the legibility can be improved. For example, the portion adjacent to a scale can have a greater brightness than a portion inclined toward the pointer shaft. At the same time, the portions can also be activated in accordance with the deflection of the pointer flag and, for example when a maximum permissible value is reached, can assume a signal color which stands out optically.

A development of the invention is particularly beneficial in that the pointer flag has a cross section that differs over its length.

By this means, it is possible to implement a large number of stylistic possibilities for improved legibility which are ruled out in the case of pointer flags which can be illuminated conventionally. For example, the pointer flag can have a greater cross section toward the outside or can have abrupt widenings or constrictions. Designs are also conceivable in which the pointer flag is spread at its end inclined toward the scale, and encloses the indicated value between two arms or within a ring on the pointer flag.

A development in which the light source can be used simultaneously to illuminate subareas of a dial is also particularly beneficial.

The reading accuracy may also be improved further by a subarea, for example the surroundings of an indicated value, being additionally illuminated by means of the light source, and the remaining values (as a result of t heir relative darkening) being blanked out at the same time.

It is advantageous if the color of the light source can also be perceived by a viewer even with a high ambient brightness, so that the pointer appears in the same color both during the day and at night, and therefore appears to be easily legible.

BRIEF DESCRIPTION OF THE DRAWINGS

The invention permits various embodiments. In order to illustrate its basic principle further, a number of these are displayed in the drawings and will be described below. In the drawing.

DETAILED DESCRIPTION OF HE PREFERRED EMBODIMENT

Figure 1:
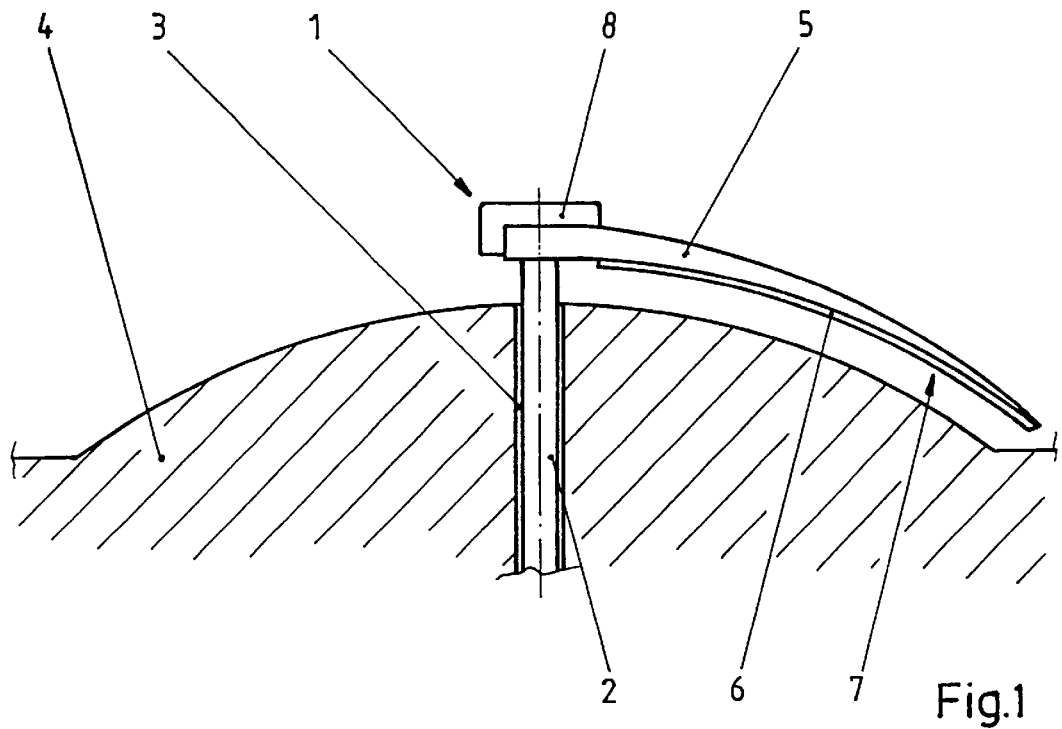
FIG. 1 shows a side, partly sectioned illustration of a pointer instrument according to the invention.

FIG. 1 shows a pointer instrument 1 according to the invention in a partially sectioned side view. The pointer instrument 1 is inserted with a pointer shaft 2 into a recess 3 in a convex dial 4. The pointer shaft 2 deflects a pointer flag 5 that is matched to the shape of the dial 4 and which, for this purpose, is arranged at a small distance from the dial 4. The pointer flag 5, which is designed to be essentially transparent, has on its underside, inclined toward the dial 4, a light source 6 designed as an electroluminescent film 6, which is matched to the contour of the pointer flag 5. The pointer flag 5 can be illuminated actively, that is to say in a self-illuminating manner, by means of electrical contacting means which are not displayed, so that the indicated value can be read without difficulty. In the region of the pointer shaft 2, the transparent pointer flag 5 is hidden by means of a pointer cap 8, which blocks the view of components of the pointer instrument 1 which are arranged underneath. The light source 7 can be used, for example, to illuminate the surroundings of the indicated value on the dial 4 at the same time, by which means the legibility can be improved further.

Figure 2:
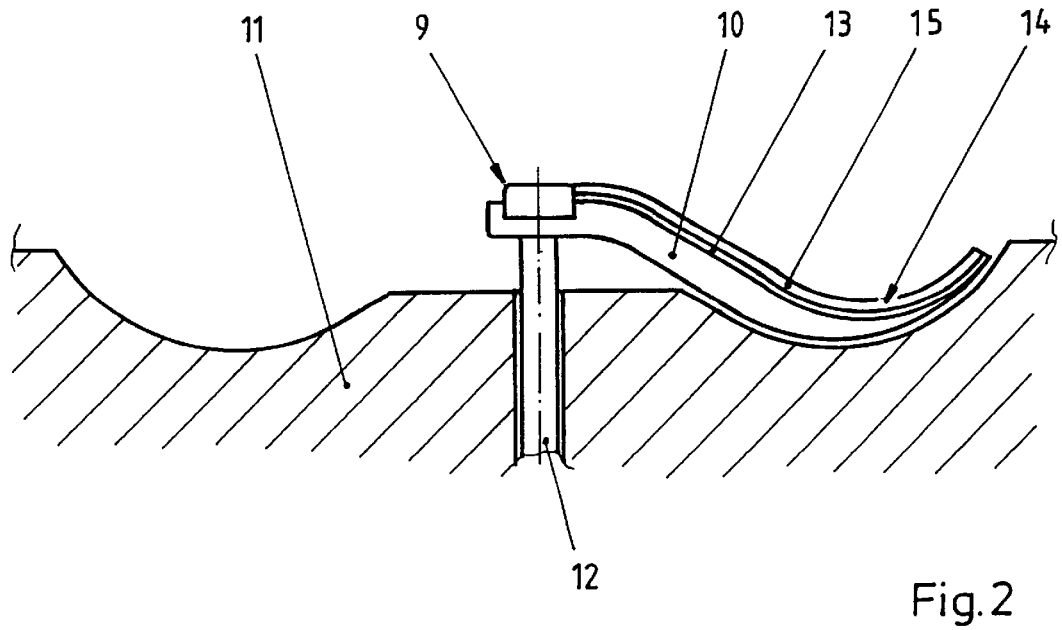
FIG. 2 shows a further pointer instrument in a side, partly sectioned illustration.

FIG. 2 shows a further embodiment of a pointer instrument 9 in a likewise partially sectioned side view. In this case, a pointer flag 10 is shaped outward to correspond to a concave dial 11 and is arranged such that it can pivot by means of a pointer shaft 12. The pointer flag 10 has a light source 14 designed as a light-emitting polymer 13, which can be excited between the pointer flag 10, simultaneously designed as an electrode and a further electrode 15 of transparent design. The ability of the light source 14 to be shaped simply permits any desired configuration of the pointer flag 10, it being possible, in particular, for the edge regions of the pointer flag 10 to be illuminated as well. In addition, the pointer flag 10 can be designed to be illuminated in different portions in different colors or brightnesses and, as a result, alternately to emphasize a desired portion optically.

FIGS. 3 to 8 show a selection of various embodiments of pointer flags 16, 19, 24, 27, 28, 32 according to the invention.

Figure 3:
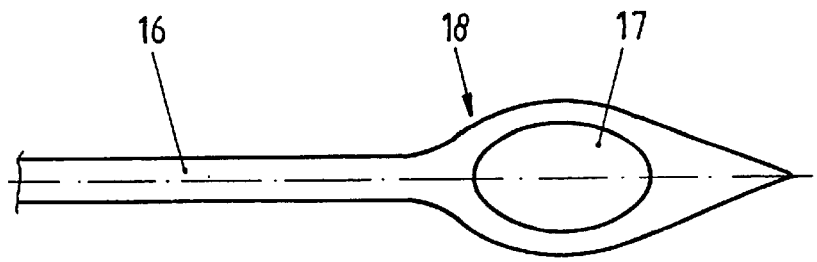
FIGS. 3–8 show further embodiments of various pointer flags.

FIG. 3 shows a pointer flag 16 having a widening 18 enclosing a cutout 17 in the region of the end section of the pointer flag 16. The pointer flag 16 is designed in such a way that the digits of the indicated value of a dial (not illustrated) are enclosed by the cutouts 17 and adjacent digits are hidden. As a result, it is possible to read the indicated value simply and largely without error.

Figure 4:
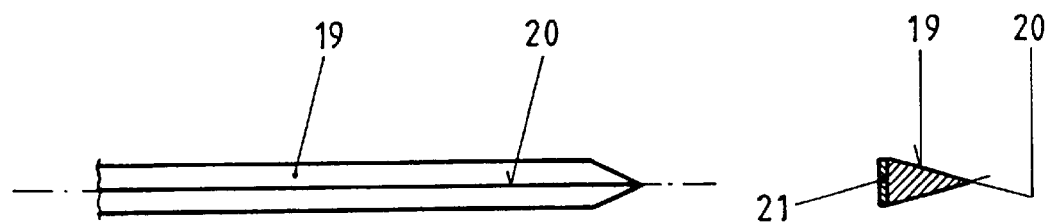

FIG. 4 shows a plan view of a further pointer flag 19. In this case, the pointer flag 19 has a triangular cross section, one edge 20 being inclined toward a possible viewer. The pointer flag 19 is designed such that it can be illuminated by means of an electroluminescent film 21 arranged on the underside, the edge 20 appearing to be particularly bright.

Figure 5:
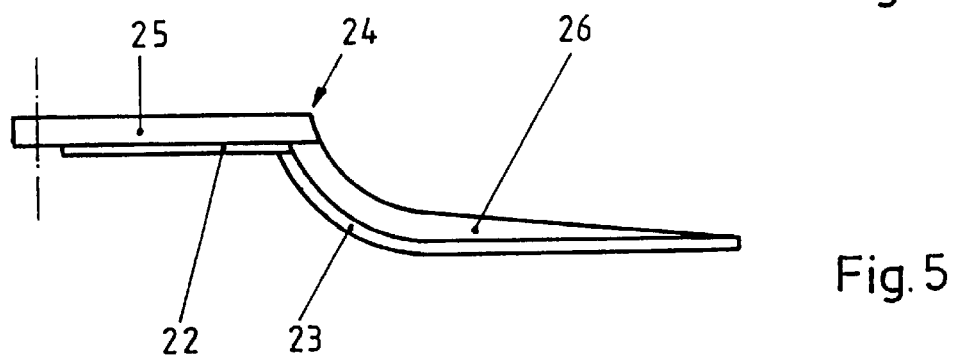

FIG. 5 shows a side view of a transparent pointer flag 24 which can be illuminated by two different electroluminescent films 22 and 23. In this case, the pointer flag 24 has two portions 25 and 26 which are mutually arranged in different planes and which can be respectively illuminated by means of one of the two electroluminescent films 22, 23. As a result of designing the two electroluminescent films 22, 23 with different colors, the outer portion 26 can be emphasized optically, for example by means of a signal color. Also possible is the use of a common electroluminescent film 22 or 23, the portions 25, 26 of the transparent pointer flag 24 having a different coloration and hence achieving a different visual impression.

Figure 6:
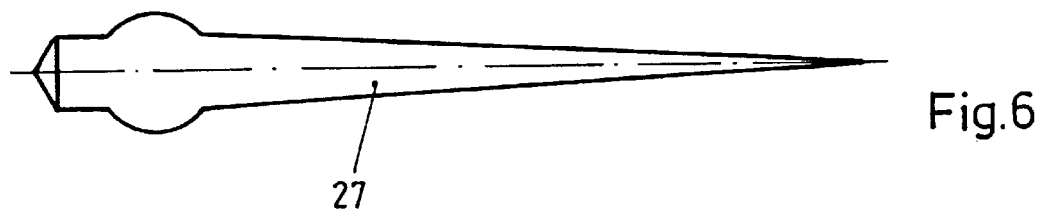
Figure 7:
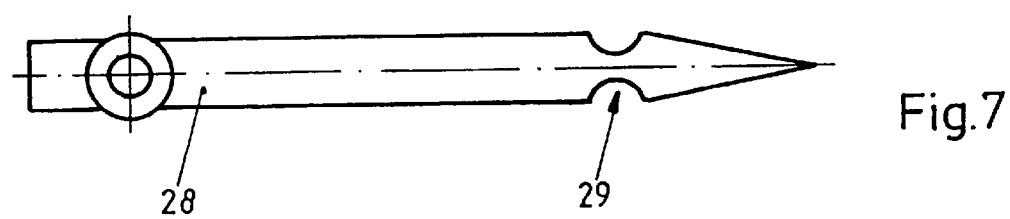

Further shapes of a pointer flag 27 and 28 are shown in plan view in FIGS. 6 and 7. In this case, FIG. 7, in particular, reveals a constriction 29 which is arranged in the region of a scale (not illustrated). In this region, the light source, which is arranged on the rear and not illustrated, can be designed at the same time to illuminate the scale.

Figure 8:
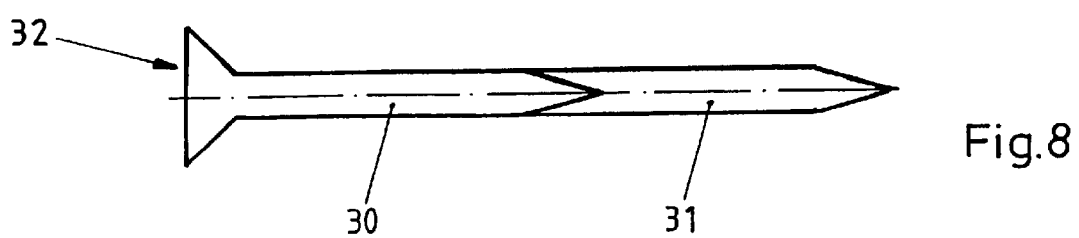

FIG. 8 shows a plan view of a further embodiment of a pointer flag 32 subdivided into two portions 30, 31. In this case, the two portions 30, 31 each have a different coating of a light-emitting polymer. In addition, further portions are conceivable which are activated only at a specific pointer position, and thus render visible the reaching of a predefined value.

What is claimed is:

1. A pointer instrument, especially for a motor vehicle, comprising a pointer with a pointer shaft that deflects a pointer flag and a light source that is connected to the underside of the essentially transparent pointer flag or to the upper side of the pointer flag so as to rotate with the pointer, the pointer flag being illuminatable by the light source, wherein contour of the light source can be shaped or is shaped essentially to correspond to at least one portion of an outside of the pointer flag, wherein the pointer flag has a number of portions that can be illuminated independently by different portions of the light source in different colors or in different brightnesses.

2. The pointer instrument as claimed in claim 1, wherein said light source (7, 14) is a flat radiator having a low height.

3. The pointer instrument as claimed in claim 1, wherein the light source (7) has an electroluminescent film (6).

4. The pointer instrument as claimed in claim 1, wherein the light source (14) has an organic LED.

5. The pointer instrument as claimed in claim 4, wherein said light source (14) has an electrically excitable, light-emitting polymer (13).

6. The pointer instrument as claimed in claim 5, wherein the pointer flag (10, 16, 27, 28, 32) is an electrode that excites the light-emitting polymer (13).

7. The pointer instrument as claimed in claim 1, wherein the pointer flag (10, 16, 27, 28, 32) has a cross section that differs over its length.

8. The pointer instrument as claimed in claim 1, wherein the light source (7, 14) can be used simultaneously to illuminate sub-areas of a dial (4, 11).

9. The pointer instrument as claimed in claim 1, wherein the different portions of the pointer flag are illuminatable in different colors.

10. The pointer instrument as claimed in claim 1, wherein the different portions of the pointer flag are illuminatable in different brightness.

11. The pointer instrument as claimed in claim 1, wherein the pointer flag is essentially transparent, and has the light source at its underside.

12. The pointer instrument as claimed in claim 1, wherein the pointer flag has a widening enclosing a cutout in a region of an end section of the pointer flag.

13. The pointer instrument as claimed claim 1, wherein the pointer flag has a constriction which is arranged in a region of a scale of the dial.

14. A pointer instrument, especially for a motor vehicle, comprising a pointer with a pointer shaft that deflects a pointer flag,
a dial which is convex or concave shaped, and
a light source that is connected so as to rotate with the pointer, the pointer flag being illuminatable by the light source, wherein contour of the light source can be shaped or is shaped essentially to correspond to at least one portion of an outside of the pointer flag, wherein the pointer flag is matched to the shape of the dial to correspond to the shape of the convex or concave dial, and the pointer flag (10, 16, 27, 28, 32) has a number of portions (25, 26, 30, 31) that can be illuminated independently by different light sources.

15. The pointer instrument as claimed in claim 14, wherein the pointer flag is multiply curved.

16. The pointer instrument as claimed in claim 14, wherein the pointer flag is arranged at a small distance from the dial.

17. The pointer instrument as claimed in claim 14, wherein the pointer flag has a number of portions that are illuminatable independently.

18. The pointer instrument as claimed in claim 17, wherein the different portions of the pointer flag are illuminatable in different colors.

19. The pointer instrument as claimed in claim 17, wherein the different portions of the pointer flag are illuminatable in different brightness.

20. The pointer instrument as claimed in claim 14, wherein the pointer flag is essentially transparent, and has the light source at its underside.

21. The pointer instrument as claimed in claim 14, wherein the pointer flag has a widening enclosing a cutout in a region of an end section of the pointer flag.

22. The pointer instrument as claimed in claim 14, wherein the pointer flag has a constriction which is arranged in a region of a scale of the dial.

23. The pointer instrument as claimed in claim 14, wherein said light source (7, 14) is a flat radiator having a low height.

24. The pointer instrument as claimed in claim 14, wherein the light source (7) has an electroluminescent film (6).

25. The pointer instrument as claimed in claim 14, wherein the light source (14) has an organic LED.

26. The pointer instrument as claimed in claim 25, wherein said light source (14) has an electrically excitable, light-emitting polymer (13).

27. The pointer instrument as claimed in claim 26, wherein the pointer flag (10, 16, 27, 28, 32) is an electrode that excites the light-emitting polymer (13).

28. The pointer instrument as claimed in claim 14, wherein the pointer flag (10, 16, 27, 28, 32) has a cross section that differs over its length.

29. The pointer instrument as claimed in claim 14, wherein the light source (7, 14) can be used simultaneously to illuminate sub-areas of a dial (4, 11).

* * * * *